2,954,372

HIGHER FATTY ACID ESTERS OF DEXTRAN

Leo J. Novak, Commonwealth Engineering Co. of Ohio, 1771 Springfield St., Dayton 2, Ohio, and Joseph T. Tyree, 5459 Blackstone Ave., Chicago, Ill.

No Drawing. Filed Nov. 16, 1956, Ser. No. 638,888

(Filed under Rule 47(a) and 35 U.S.C. 116)

2 Claims. (Cl. 260—234)

This invention relates to higher fatty acid esters of dextran having unexpectedly strong adherence to skin and to epidermal and albuminoidal proteins.

The esters of the invention contain an average of about 3.0 higher fatty acid radicals per anhydroglucose unit of the dextran.

The acid radicals are derived from saturated fatty acids containing from 14 to 18 carbon atoms.

The esters can be made by reacting dextran with an esterifying derivative of the higher fatty acid. Preferably a halide such as a chloride of the fatty acid is used. The reaction is carried out in the presence of an acid acceptor or binding agent. The acid acceptor may be an organic base, such as, for instance, a tertiary heterocyclic amine like quinoline, pyridine, N-methyl morpholine, etc. The reaction mass also comprises a substance in which the ester is at least partially solvated as it is formed. The presence of the partial solvent insures a substantially uniform, homogeneous reaction.

Substances which dissolve or swell the ester as it is formed are, for example, xylene, toluene, dioxane, etc.

In general, the reaction under the aforesaid conditions can be carried out at 100° C. to 155° C. for a period of time which varies inversely with the temperature used. Both the temperature employed and the reaction time depend on the boiling point of the mixture of acid acceptor and partial solvent used.

For instance, if such mixture consists of quinoline and xylene, the reaction is carried out by heating the mass at 150° C. to 155° C. for 30 minutes to an hour. When a mixture of pyridine and toluene is used, the mass is preferably heated at 100° C. to 115° C. for one to three hours.

The dextran fatty acid ester at least partially dissolved in the crude reaction product can be isolated by washing the crude product with water to remove the organic base as the hydrochloride produced in the reaction, removing the aqueous layer, adding a solvent for the ester to the residue, and precipitating the resultant solution into a non-solvent for the ester.

A lower aliphatic alcohol, e.g., methanol, ethanol, isopropanol, may be used as precipitant. The precipitated ester is filtered off. It may be dried directly or further purified by re-precipitation and then dried.

The esters can also be produced by reacting the dextran with the selected higher fatty aicd. This reaction is carried out with the aid of an esterification catalyst, such as magnesium perchlorate. An "impeller" is also present. The impeller may be a monohalogenated monobasic organic acid anhydride. Temperatures at which the reaction mixture remains in the liquid state are used. Such temperature varies with the reactants used. Generally, the temperature is in the range of 50° C. to 100° C. The reaction time varies inversely with the temperature, and is between 30 minutes and two hours.

The ester produced under the conditions just described is isolated from the crude reaction mass by cooling the latter, dissolving it in a solvent therefor, and precipitating it into a non-solvent for the ester. Such solvent is one in which the chloracetic acid resulting from the addition of water formed as by-product in the reaction to the anhydried "impeller" remains in solution. The ester is filtered from the non-solvent and dried.

Two or more of the pure acids or acid chlorides may be used, to obtain mixed esters. Commercial acids comprising mixtures may also be used, such as technical grade stearic acid comprising mixed stearic and palmitic acids. The product is a stearate-palmitate of the dextran or dextran derivative.

As shown in the examples below, the conditions for the esterification are selected to insure the production of final products containing an average of about 3.0 fatty acid radicals per anhydroglucose unit.

These esters occur as white to light yellow granular solids. They are soluble in organic solvents, particularly of the non-polar type such as halogenated hydrocarbons, e.g., chloroform, carbon tetrachloride, "Freons" (commerically available chlorofluoro-methanes like "Freon 11," a trichloro-monofluoro-methane, and "Freon 12," a dichloro-difluoro-methane), and in the common organic solvents such as benzene, toluene and the xylenes.

Although the dextran from which the fatty acid esters are derived may be water-soluble and is, in any case, hydrophilic, the esters are wholly hydrophobic. The esters show, also, an unexpectedly strong adherence to skin. When a solution of, for example, dextran palmitate containing an average of about 3.0 palmitoyl radicals per anhydroglucose unit is applied to the skin in an organic solvent solution, evaporation of the solvent leaves a film of the ester deposited on the skin which cannot be removed by scrubbing with plain water, soapy water or abrasives like "Dutch Cleanser."

This resistance to water and aqueous media, which is very strong, and stronger than would be expected to result from the substitution of three of the fatty acid radicals on the units of a hydrophilic polysaccharide, may be due to the particular structure of dextran which, as is known, is made up of anhydroglucose units predominantly linked 1,6. That the structure of the parent dextran is a contributing factor to the water-resistance and affinity for skin of the esters appears from the fact that the characteristics of films of the esters, i.e. the strong resistance to water, soap and abrasives and the capacity to bond tenaciously to skin, are not dependent on the molecular weight of the dextran. This is surprising, since it might have been expected that at least the resistance to water and aqueous media would depend on, or at least be influenced by, the total number of fatty acid radicals present in the end product. The overall number of such groups present increases with increase in the molecular weight of the dextran. Native, unhydrolyzed dextran produced microbiologically in the usual way by the action of dextran-synthesizing strains of Leuconostoc on sucrose has a molecular weight estimated in the millions. The number of anhydroglucose units of which it is comprised is extremely large, so that the total number of, say palmitoyl groups, present in each molecule of the ester having an average palmitoyl radical content of 3.0 per unit of the dextran is also extremely large.

Dextran of lower molecular weight obtained, for example, by partial hydrolysis of the native dextran, is comprised of a smaller number of anhydroglucose units. The overall fatty acid radical content per molecule of the dextran ester is correspondingly lower. Nevertheless, the resistance to water, soap, and abrasives of the esters derived from dextran hydrolyzates, such as those having an average molecular weight of 60,000 to 80,000 is substantially the same as is exhibited by the esters derived from native, unhydrolyzed dextran.

The strong adherence of these esters to skin and epidermal and albuminoidal surfaces, is not exhibited by similar esters of other parent substances. That property, as well as the resistance of the esters to water and aqueous media containing either soap or abrasives, apparently results from a combination of the specific structure of the dextran and the presence of about 3.0 of the specific fatty acid radicals on substantially all of the units making up the dextran.

The presence of about 3.0 of the radicals of the fatty acid containing 14–18 carbon atoms, on each of the units of the dextran, appears to be critical. A native, unhydrolyzed dextran containing an average of only 2.0 palmitoyl or stearoyl radicals per anhydroglucose unit, does not have the adherence to skin that is exhibited by a palmitate of a hydrolyzed dextran of relatively low molecular weight, such as 60,000 to 80,000, and which contains about 3.0 palmitoyl radicals per anhydroglucose unit, even though, due to the extremely high molecular weight of the native dextran and the very large number of anhydroglucose units making up the molecule thereof, the overall content of palmitoyl radicals is higher. Evidently the presence of any substantial proportion of free hydroxyl groups not only decreases the hydrophobic property of the ester but also interferes with the capacity of the ester to adhere to the skin.

The present dextran esters resemble wax to the extent of having a slippery feel but unlike wax and wax-like materials generally are not emulsifiable with water using known emulsifying agents.

The resistance of the esters to water and aqueous media containing soap or abrasives adapts them to various important uses. The additional property of adhering tenaciously to skin both in the dry condition and when scrubbed with water, soap and water or even with abrasives, makes these esters particularly suitable for use in various cosmetic preparations, including lipsticks, rouge, liquid make-up preparations, creams, lotions, and so on. The esters are perfectly adapted to use as so-called chemical gloves, and have a special advantage for that use resulting from the natural affinity of the esters for skin, to which they impart a smooth, silky feel. Use of the esters in various textile applications, e.g., as soft finishing agents for fibers, fabrics and yarns, is also indicated.

The following examples are given to illustrate specific embodiments of the invention.

*Example I*

Twenty gms. of native, unhydrolyzed dextran produced in the usual way, 105 gms. of stearic acid, 105 gms. of chloracetic anhydride and 5.0 gms. of magnesium perchlorate are heated at 70° C. to 75° C. for one hour, with vigorous agitation. The mass is cooled to room temperature, and a mixture of 100 mls. of chloroform and 100 mls. of xylene is added. The solution thus obtained is precipitated in one liter of methanol, filtered, redissolved and reprecipitated and again filtered, after which it is dried.

On analysis the dextran stearate is found to contain an average of 2.9 stearoyl groups per anhydroglucose unit. It is very soluble in chloroform, carbon tetrachloride and "Freons," soluble in benzene, toluene and xylenes. It is completely insoluble in water. Applied to the hands in the form of a chloroform solution, the stearate forms a film which is not removed by scrubbing with water, soap and water, or water mixed with an abrasive. The film remains on the hands without peeling until it is removed by an organic solvent therefor.

*Example II*

Twenty gms. of hydrolyzed dextran having molecular weights between 20,000 and 200,000, average about 60,000 to 80,000, 100 gms. of palmitoyl chloride, 75 gms. of pyridine and 75 gms. of toluene are heated under reflux with vigorous agitation at 105° C.–110° C. for one and a half hours. The mixture is cooled rapidly to room temperature and washed with 250 mls. of water in a separatory funnel. The aqueous layer is removed. About 100 mls. of chloroform are added to the residue, with shaking to insure that the residue is dissolved. The resulting solution is poured, with vigorous agitation, into a liter of methanol to precipitate the ester. The ester is collected on the Büchner funnel, redissolved in a mixture of 75 gms. of toluene and 100 mls. of chloroform, reprecipitated in methanol, collected and dried. On analysis, the dextran palmitate is found to contain an average of 2.9 palmitoyl radicals per anhydroglucose unit. It is very soluble in chloroform, carbon tetrachloride and "Freons," and soluble in benzene, toluene and the xylenes.

A film of the ester deposited on the hands from organic solvent solution is not removed by water, soap and water, or scouring with abrasives. It is entirely harmless to the skin and is an ideal chemical glove.

*Example III*

Example I is repeated using 100 gms. of myristic acid. Dextran myristate containing an average of 2.9 myristoyl groups per anhydroglucose unit is obtained. It has the same properties as stearate and palmitate of Examples I and II.

[NOTE.—The content of ester groups was determined by adding a known volume of a standard solution of sodium or potassium hydroxide to a weighed sample of the ester, heating the mixture under reflux to saponify the ester, and titrating the excess base with standard acid solutions.]

The invention is defined in the appended claims.

What is claimed is:

1. A dextran ester of a saturated fatty acid containing from 14 to 18 carbon atoms, said ester comprising an average of about 3.0 radicals derived from said fatty acid per anhydroglucose unit of the dextran, said dextran being unhydrolyzed and having a molecular weight of 60,000 to 80,000, said dextran ester being substantially insoluble in water and forming a thin, adherent protective film when applied to the skin.

2. A dextran ester as set forth in claim 1, wherein the saturated fatty acid is palmitic.

References Cited in the file of this patent

UNITED STATES PATENTS

| | | |
|---|---|---|
| 2,052,029 | Harris | Aug. 26, 1936 |
| 2,229,941 | Stahly et al. | Jan. 28, 1941 |
| 2,437,561 | Schaaf | Mar. 9, 1948 |
| 2,459,566 | Lee | Jan. 18, 1949 |
| 2,587,623 | Jeanes et al. | Mar. 4, 1952 |
| 2,671,779 | Gaven et al. | Mar. 9, 1954 |